(12) United States Patent  (10) Patent No.: US 8,560,398 B1
Gregov et al.  (45) Date of Patent: Oct. 15, 2013

(54) METHOD AND SYSTEM FOR PROVIDING ITEM RECOMMENDATIONS

(75) Inventors: Andrej Gregov, Seattle, WA (US); Michael R. Anderson, Tacoma, WA (US); Jeffrey D Lehman, Lynnwood, WA (US); Jeffrey I Brownell, Seattle, WA (US); Jeffrey Few, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1557 days.

(21) Appl. No.: 11/693,063

(22) Filed: Mar. 29, 2007

(51) Int. Cl.
*G06Q 30/00* (2012.01)
*G06Q 30/06* (2012.01)
*G06Q 30/02* (2012.01)

(52) U.S. Cl.
CPC ............... *G06Q 30/06* (2013.01); *G06Q 30/02* (2013.01)
USPC ........................................ 705/26.2; 705/26.7

(58) Field of Classification Search
USPC .................... 705/26, 27, 26.2, 26.7
See application file for complete search history.

(56) References Cited

U.S. PATENT DOCUMENTS

| | | | |
|---|---|---|---|
| 6,317,722 B1 | 11/2001 | Jacobi et al. | |
| 7,376,588 B1 * | 5/2008 | Gregov et al. | 705/26 |
| 7,603,367 B1 | 10/2009 | Kanter et al. | |
| 7,668,821 B1 | 2/2010 | Donsbach et al. | |
| 2002/0161664 A1 * | 10/2002 | Shaya et al. | 705/26 |
| 2003/0105682 A1 * | 6/2003 | Dicker et al. | 705/27 |
| 2005/0102202 A1 * | 5/2005 | Linden et al. | 705/27 |
| 2006/0015412 A1 * | 1/2006 | Go | 705/26 |
| 2006/0036510 A1 * | 2/2006 | Westphal et al. | 705/26 |
| 2008/0243637 A1 * | 10/2008 | Chan et al. | 705/27 |
| 2008/0243638 A1 * | 10/2008 | Chan et al. | 705/27 |

FOREIGN PATENT DOCUMENTS

WO          WO 0219203 A2 *   3/2002

* cited by examiner

*Primary Examiner* — Amee A Shah
(74) *Attorney, Agent, or Firm* — McCormick, Paulding & Huber LLP

(57) ABSTRACT

Method and systems for providing item recommendations, displays categories (or tags) of recommended items where the categories are displayed using a quantity identifier indicative of the number of recommended items in that category. When a category is selected, a slide show viewer displays a number of items from the selected category.

27 Claims, 5 Drawing Sheets

METHOD AND SYSTEM FOR PROVIDING ITEM RECOMMENDATIONS

TECHNICAL FIELD

This disclosure relates generally to a method and system for displaying items in a user interface and, more particularly, to a method and system for providing (displaying and selecting) item recommendations.

BACKGROUND

It is now commonplace for consumers (or customers or shoppers or buyers) to select goods or products to be purchased, rented or otherwise obtained from remote client-server based suppliers. For example, such suppliers may be e-commerce or Internet-based retailers or merchants, which also may be referred to as an on-line retailer. For example, on-line retailers have set up on-line Internet web sites where consumers can shop for the products (or items or goods) that are available, purchase or rent the products desired and have the products delivered to them. These products may be tangible goods, such as groceries, books, CDs, DVDs, tools, clothes, footwear, health/beauty items, hardware, or any other tangible goods that are physically delivered to the customer, or "digital" goods, such as electronic books, music, movies/videos, application software, or any other digital product that is downloaded, copied, transmitted or otherwise electronically transferred to the customer. Items could even be animals or people, such as could be used in an animal adoption context or on a social networking or dating website.

It is also known for on-line merchant websites to anticipate the customer's on-line shopping needs by providing recommended items for the customer to purchase, such as is described in U.S. Pat. No. 6,317,722, entitled "Use of Electronic Shopping Carts to Generate Personal Recommendations", issued Nov. 13, 2001, to Jacobi, et al. These recommendations can be, for example, based in part on the customer's current and historical buying habits, the customer's likes and dislikes, and other factors, and can be displayed as a list of recommended items. To review the recommendations, the customer scrolls through the recommended items list and, if a desired item is found, the customer selects (or clicks on) a desired recommended item, which causes the website to display the item details, including the product specifications, characteristics, features and/or images of the recommended item. After reviewing the item details, the customer either buys the recommended item or returns to the recommended items list to search for another recommended item to review. In addition, often the number of recommended items are many and, thus, the recommendations list is long (e.g., several web pages). As a result, to find a desired recommended item to purchase, the customer may spend a significant amount of time scrolling through the recommendations list to find the desired item. This review and selection process can be very cumbersome and inefficient, may lead to buyer frustration, and may increase the likelihood that the customer will by-pass the merchant's recommendation feature in the future, thereby leading to lower overall sales for the merchant.

Therefore, the current techniques for providing recommended items for shoppers can be inefficient, frustrating and lead to lost sales and loss of repeat business for the merchant. Accordingly, it would be desirable to have a system or method for providing recommendations for shoppers that overcomes the limitations and inefficiencies of the conventional approaches, that among other potential benefits, provides a more efficient way of displaying and/or selecting recommended items from merchants and/or makes it more convenient and efficient for the customer to purchase recommended items, thereby improving the overall shopping experience with the merchant.

SUMMARY

According to the present disclosure, an illustrative method comprises causing the display of categories from a list of recommended items, each item having at least one category associated therewith, each of the categories being displayed having a quantity identifier associated therewith indicative of the number of items in the category; and causing the display of a viewer having a predetermined number of the items therein corresponding to items in at least one of the categories.

For example, when Jane accesses the merchant's web site, it displays a screen that lists a series of recommendations identified by categories (or tags) in a window or a "tag cloud". Jane recognizes that there are many recommendations in the category "Action & Adventure" because this category has a large font size as compared to all the categories listed in the cloud. When Jane selects the Action & Adventure category, an adjacent "slideshow viewer" window displays a series of five adjacent thumbnail images indicative of the first five recommended items in the "Action and Adventure" category. Jane clicks on a scroll button and scrolls the images in the viewer to the right to reveal other recommended items in that category until she finds the image for the book "Fahrenheit 451, by Ray Bradbury". When Jane mouses over the image for this book, a pop-over window appears, which explains why this book was recommended for her (e.g., Jane currently owns a related book). When Jane clicks on (or selects) the image of the book in the slideshow window, a separate item detail pop-up window appears that allows Jane to review the item details for the book. Jane then selects the option to purchase the book and this book is shipped to her.

Another embodiment of the present disclosure provides a method and system for displaying and selecting recommended items by grouping the recommended items into categories (or tags or labels or category names or category tags or category labels) and displaying the categories using a quantity identifier, which allows the customer to know, by inspection, the relative number of replacement items in each category. The quantity identifier may be text font size, font style, font color, background color, outline color, category images, or any combination of these, or any other quantity identifier. The quantity identifier may also use compound visual approaches, such as displaying a combination of the aforementioned text fonts, colors, and/or images with an adjacent number indicative of the number of recommendations in that category. The number of recommended items may also be viewed in a pop-over window may appear upon mousing over a category.

The disclosure allows the customer to select a category and have a predetermined number of item images in the category displayed in a slideshow viewer. The user interface is easy to navigate and makes it easy to keep track of the recommended items in the list. The customer is provided with control arrows to advance the slide show images to the left or right to allow the customer to view all the recommendations in a given category. In addition, the system provides an "All Categories" category that allows the slideshow viewer to scroll through all the recommendations. Further, the location of the categories "tag cloud" window and the slideshow viewer window may be located in any orientation individually and relative to each other.

Still further the categorizing or tagging of items is automated and thus the customer does not have to do any manual tagging of items to allow the website to create the tag cloud or recommendations.

The foregoing and other objects, features and advantages of the present disclosure will become more apparent in light of the following detailed description of exemplary embodiments thereof.

DETAILED DESCRIPTION

Figure 1:
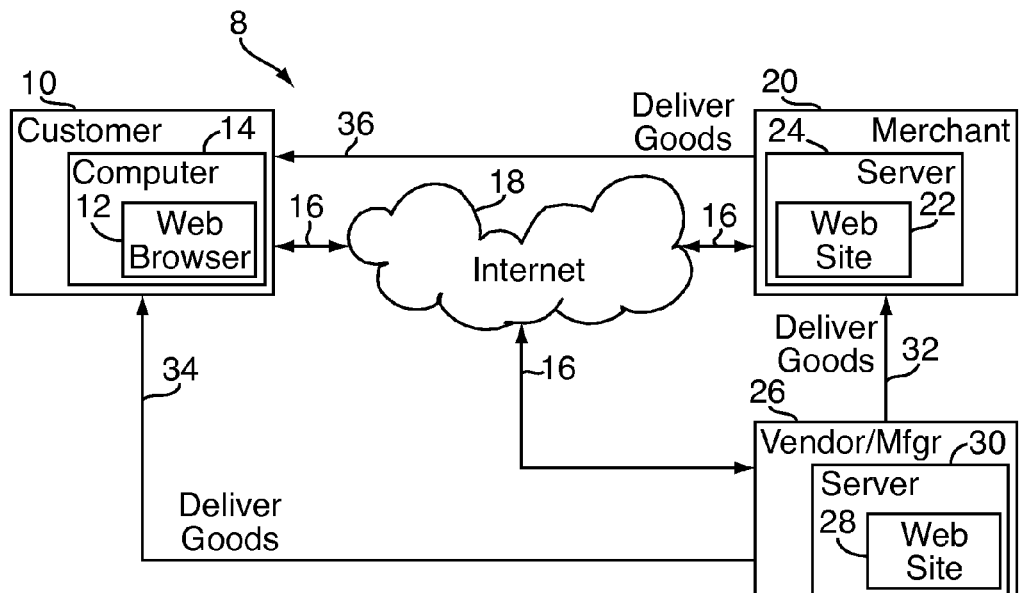
FIG. 1 is a block diagram of the components of a customer-merchant on-line shopping system, in accordance with embodiments of the present disclosure.

FIG. 1 illustrates the principal components of an embodiment of a customer-merchant on-line ordering system 8, which includes a customer 10 (or consumer or client or shopper or buyer) and an on-line (or e-commerce or Internet-based) merchant (or supplier or retailer or seller or reseller or distributor) 20. The customer 10 can be, for example, any entity or individual that wishes to purchase or rent goods (or products) or services from the on-line merchant 20. The customer 10 uses a web browser 12 running on a computer 14. The merchant 20 is an entity that rents or sells products from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", can be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other web-enabled applications or features including email, or other messaging techniques to communicate with (or connect to) the merchant web site 22 and/or server 24 through the communications network 18. Furthermore, although embodiments are described herein as involving the interaction between a web browser 12 and merchant website 22, any client logic that is capable of remotely interacting with compatible server logic on the merchant system 8 could be used.

In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, home gaming consoles, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to make purchases, the customer 10 can browse through product information concerning goods (or products) or services available for purchase from the on-line merchant 20. After selecting a product or products that the customer 10 wishes to purchase, a product order is sent to the merchant 20. The product order is placed via a communication from the web browser 12 to the web site 22 operating on the server 24 of the merchant 20, which includes payment by the customer 10 to the merchant 20 for the goods. The merchant 20 then delivers the goods to the customer 10 as indicated by the line 36. Alternatively, the vendor 26 may deliver the goods directly to the customer 10 as indicated by the line 34.

Figure 2:
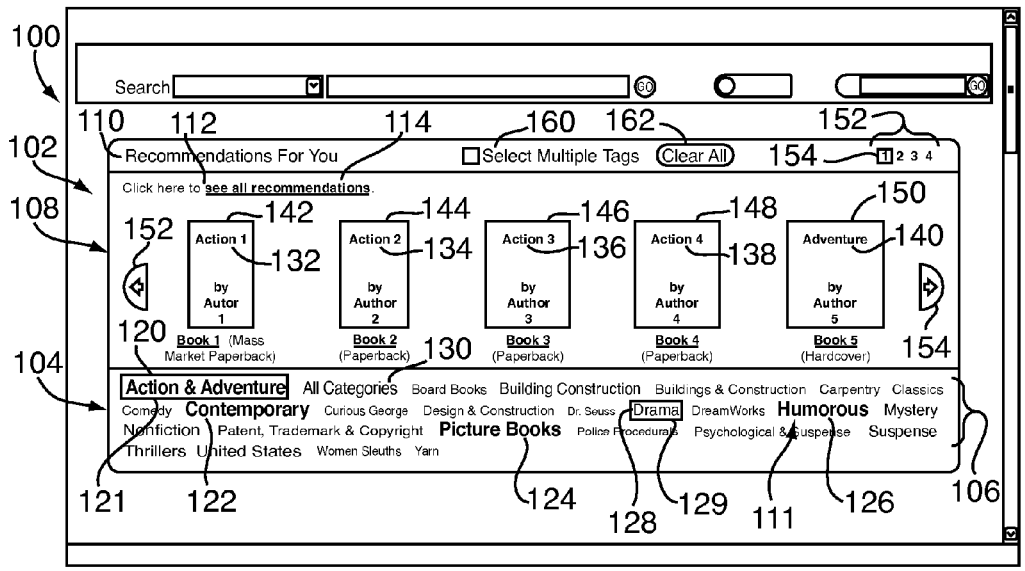
FIG. 2 is a screen illustration of a recommendations window, in accordance with embodiments of the present disclosure.

Referring to FIG. 2, a sample merchant website screen 100 (or graphic user interface or GUI or web page) has a recommendations window 102 having a categories list or "tag cloud" section 104 and having a "slideshow viewer" section 108. The tag cloud 104 displays a list of categories (or tags or labels or category names or category tags or category labels) 106 associated with the recommendations and the viewer 108 displays thumbnail images of recommended items (discussed more hereinafter).

An example of a tag cloud is described in U.S. patent application Ser. No. 11/281,886, entitled "Recommendations Based on Item Tagging Activities on Users", filed Nov. 17, 2005, which is incorporated herein by reference in its entirety. The tags (or categories) 106 associated with specific items may be generated manually by the customer (or user) 10, such as is described in the aforementioned patent application, or automatically, as described hereinafter, or a combination of both or any other way.

The display sections 104,108 may be part of the larger window 102 or they may be separate detached or detachable windows within the main website screen 100. The window 102 may be displayed upon access of the web site or upon login by the customer 10 to the merchant's website 22, or at any other time. At the top of the window 102, is a main title header 110, which states, "Recommendations For You". Any other title header or no header may be used if desired. In addition, under the main title header 110, there is an optional sub-header 112, which states, "Click here to see all the recommendations". This sub-header 112 provides a link 114 to show all recommendations, which, when selected, launches a new display page (not shown) that provides a full list of all the recommended items.

If the customer 10 accesses the merchant web site, but has not yet logged in, the user interface may provide a default tag cloud that shows generalized, non-personalized recommendations, e.g., top selling items, new releases, etc. The default tag cloud may be based on aggregate behavior of all customers, may be partially personalized by identifying the geographic location of the customer computer's IP address or by evaluating the customer's clickstream while on the site (prior to login), or may be based on other criteria.

According to some embodiments, when the merchant's web site displays the tag cloud 104, each of the categories or tags 106 is displayed having a predetermined quantity identifier 111, e.g., font size, indicative of the number (or quantity) of recommended items associated with that tag. The larger the tag font size, the more recommended items there are associated with that tag. Accordingly, for the example shown in FIG. 2, the tags 120 (Action & Adventure), 122 (Contemporary), 124 (Picture Books), and 126 (Humorous), have more recommendations than the rest of the tags 106 because they have the largest font sizes in the tag cloud 104. The relationship between the tag font size and the number of recommended items associated with that tag may be as shown in Table 1 below, where a predetermined range of recommended items for a given tag corresponds to a certain tag font size. Any other ranges or font sizes may be used if desired. In addition, if there are less than a predetermined minimum number of recommended items for a given tag, e.g. three, the tag is not displayed in the tag cloud 104 (discussed more hereinafter). Other minimum number of items for tags may be used.

TABLE 1

| Number of Recommended Items | Tag Font Size |
| --- | --- |
| 1 to 2 | Not Displayed |
| 3 to 5 | 9 pt. |
| 6 to 10 | 10 pt. |
| 11 to 15 | 12 pt. |
| 16 to 20 | 14 pt. |

Figure 9:
FIG. 9 is an illustration of example quantity identifiers, in accordance with embodiments of the present disclosure.

The quantity identifier maybe a characteristic of the text of the tag, e.g., font size, font style, font color, etc., or it may be other visual effect or attribute associated with the tag, e.g., background color, outline color, images, etc., or any combination of the above, or any other quantity identifier that allows the customer 10 to determine the relative number of replacement items in each category by looking at the window 104. Referring to FIG. 9, the quantity identifier associated with each tag may also use compound visual effects, such as displaying a combination of various text fonts, colors, and/or images with an adjacent number indicative of the number of recommendations for that tag, e.g., subscript 178, superscript 180, parenthetical 174.

According to some embodiments, the visual effect of the tags in the tag cloud could represent features other than the quantity of items in that category. For example, among others, the visual effect could represent the significance of the items in that category or could represent categories believed to be a favorite of the customer. For example, if there are recommendations in a particular category that are believed to be more significant than recommendations in other categories, this could be reflected by, among other visual effects, providing contrasting font sizes or styles that are readily recognized by the user.

Furthermore, in some embodiments, the tags may be images, icons, video or other visual representations of categories. For example, a sporting goods category could be represented by an icon depicting a tennis racket and a romance category could be represented by a heart. In such embodiments, the visual effect may include using contrasting sizes or colors of the visual representation, among other possibilities. Further, the tags may be a combination of system-generated and/or user-generated tags.

When the customer 10 selects (or clicks on) one of the various tags 106, e.g., tag 120 "Action and Adventure", a box 121 appears around the tag 120 and the viewer 108 displays a series of five adjacent thumbnail images 132-140 of the items in five corresponding adjacent locations 142-150, indicative of the first five recommended items in the selected tag or category 120, respectively. In addition, the tag cloud 104 provides an "All Categories" tag 130, which, when selected, places all the recommended items in all the tags 106 to be displayed in the viewer 108. In that case, even though a given recommended item may be associated with more than one tag (discussed hereinafter), each recommended item appears only once in the viewer. This feature allows the customer 10 to scroll through all the recommendations using the viewer 108.

Prior to the Customer 10 selecting one of the tags 106 in the tag cloud 104, the viewer 108 displays a default view of items, e.g., the "All Categories" tag items. In some embodiments, the default view for the viewer 108 may be the display of items associated with a tag having the most items, the items most relevant to the customer 10, or any other criteria.

When the customer 10 selects (or clicks on) one of the images 132-140 in the viewer 108, the web site displays a known product (or item) detail window (not shown). The item detail screen (not shown), as is known, may contain specific detailed information about the item corresponding to the images 132-140 in the viewer 108, including one or more of: Product Name, Images, Availability, Manufacturer, Price, Shipping information, Product Specifications and/or Features, and the like. The customer 10 may then select the option to purchase the item and the item is shipped to the customer 10.

Further, there may be a checkbox 160 in the recommendations window 102 or the tag cloud 104, which, when checked, allows the customer 10 to select multiple tags in the tag cloud 104, and the associated items to be displayed in the viewer 108, by clicking on multiple images in the tag cloud 104. For example, if the customer 10 is viewing items recommended under the Action & Adventure tag 120 in the viewer 108, and then clicks on the checkbox 160 and then clicks on the "Drama" tag 128, a box 129 also appears around the "Drama" tag 128 and the recommended items under the tag 128 are added to the items in the viewer 108, and are available to be viewed by the customer 10 together with the images from Action & Adventure that are already in the viewer 108. The customer 10 can continue to click on tags and add to the images shown in the viewer 108. If the customer clicks on a tag a second time, the box around the tag is removed and the corresponding items are removed from the viewer 108. In addition, the customer 10 may clear all selected tags 106 by clicking on the optional clear button 162.

It should be understood that for any of the embodiments herein, when an image in the viewer 108 or a tag in the tag cloud 104 is selected, the display is updated to display the associated image or tag with a box, an outline, a color, shading, shadow, or some type of highlighting or mark so that the selected status thereof is distinguishable from those images and tags that have not been selected.

If there are more than the predetermined maximum number of images, e.g., five, in the viewer 108 (e.g., there are more than five recommended items in the selected tag 106), left and right scroll arrow buttons 152,154, respectively, appear. The maximum number of images in the viewer 108 may be any desired number, depending in part on the size of the images 132-140 and the size of the browser screen. When the customer 10 selects (clicks on) the left scroll arrow button 152, the images 132-140 all scroll (or index or shift) to adjacent positions to the right, e.g., the image 140 disappears, the image 138 moves to the position 150 (previously occupied by image 140), the image 136 moves to the position 148, the image 134 moves to the position 146, the image 132 moves to the position 144, and a new image (not shown), indicative of the previous item on the recommendations list, appears in the position 142. When the first item on the list is displayed in the first position 142 of the viewer 108 and the scroll button 152 is clicked, the viewer 108 then displays the last five images on the list. Optionally, when the first item on the list is displayed in the first position 142 of the viewer 108, the images 132-140 do not move to the right when the scroll button 152 is clicked, as the viewer 108 is at the top of the list.

Similarly, if the customer 10 clicks on the right scroll button 154, the images 132-140 all scroll (or index) to the adjacent positions to the left, i.e., the image 132 for Book 1 disappears, the image 134 moves to the position 142 (previously occupied by the image 132), the image 136 moves to the position 144, the image 138 moves to the position 146, the image 140 moves to the position 148, and a new image (not shown), indicative of the next item on the recommendations list, appears in the position 150. When the last item on the list is displayed in the last position 150 of the viewer 108 and the scroll button 154 is clicked, the viewer 108 again displays the first five images 132. Optionally, when the last item on the list is displayed in the last position 150 of the viewer 108, the images do not move to the left when the scroll button 154 is clicked, as the viewer 108 is at the bottom of the list.

Instead of an index-type scroll described above where there are preset positions for each image, a smooth or continuous scroll may be used, in which case there are no fixed positions for the images 132-140 in the viewer 108 and the images 132-140 scroll smoothly across the viewer window 108 in the desired direction based on the selection of the scroll buttons 152,154. In the case of a continuous scroll slider, the images may stop at any location in the viewer 108 including having a partial image at the end edges of the viewer 108. Also, the scroll buttons 152,154 may be located anywhere near the viewer 108.

Also, if there are more than the predetermined maximum number of images in the viewer 108, a series of page numbers 152 are provided to allow the customer 10 to page through the images in the viewer 108. In particular, each number indicates a group of 5 images in the viewer 108, and a box 154 appears around the page currently being viewed. Thus, the page numbers 152 for the example shown in FIG. 2 would have four screens and up to twenty total images of recommended items in the viewer 108, with the current viewer 108 showing the first five images.

Figure 3:
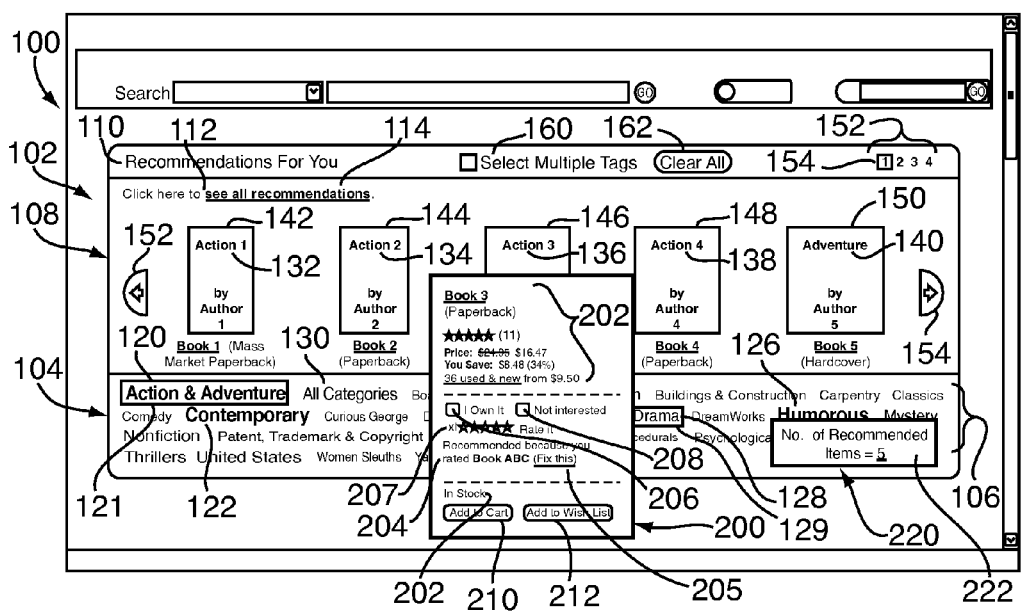
FIG. 3 is a screen illustration of the window of FIG. 2 with pop-over windows, in accordance with embodiments of the present disclosure.

Referring to FIG. 3, when the customer 10 places the mouse over (or "mouses over") one of the images 132-140, e.g., the image 136 for the Book 3, a pop-over window 200 appears over or near the image 136. The window 200 may provide a brief summary description 202 of the item associated with the image 136, such as the product name, manufacturer, availability (e.g., in stock, out of stock, discontinued, etc.), price, shipping cost, and the like. Also, the window 200 has a field 204 that explains why the item 136 was recommended for the customer 10, e.g., the customer 10 rated a related book ABC. Also, a "fix this" link 205, is provided to allow the customer 10 to change the recommendations triggers. In particular, if the link 205 is selected, a pop-over window (not shown) explains why this item was recommended to the customer 10, e.g., because the customer purchased a related item, because the customer's wish list had a related item, or for other trigger reasons, with checkboxes to enable or disable these triggers.

Also, the window 200 has a checkbox 206, which the customer 10 may select if he/she already owns the item 136 and the item 136 is then removed from the recommendations list. Also, a field 207 is provided that allows the customer 10 to rate the item 136. If the customer 10 chooses to rate the item 136, it is then removed from the recommendations list because the customer 10 already owns it. Further, the window 200 has a check box 208, which the customer 10 checks if he/she is not interested in the item 136. In that case, the item is removed from the recommendations list. The window 200 may also have the fields "Add to Cart" 210 and "Add to Wish List" 212, or other fields, which when selected, the website performs the specified functions.

Also, the number of recommendations for a given tag may appear in a pop-over window 220 upon a mouse-over of a tag. For example, when the customer 10 mouses over the "Humorous" tag 126, a window 220 appears with a message 222 indicating the number of recommended items for the tag 126, e.g., "No. of Recommended Items=5". Instead of the message 222 being a phrase or sentence in words, it may display only the number of recommended items, e.g., "5", "five", or "5 (five)", or the like. It should be understood that while the sample screens shown herein show recommended items relating to books, any type of products or items may be used. Other information may also be displayed in the pop-over window 220, e.g., the breakdown of how many of the items are books and DVDs, or any other information that may be relevant and informative to the customer 10 regarding the recommended items.

Referring to FIG. 2, the location of the categories "tag cloud" window 104 and the slideshow viewer window 108 may be located in any orientation individually and relative to each other. For example, slideshow top and cloud bottom; slideshow bottom and cloud top; slideshow left and cloud right; and slideshow right and cloud left. Further, for example, slideshow may list items vertically, horizontally, or at any other angle and the categories cloud may list categories vertically, horizontally, or at any other angle, independent of the list orientation of the slideshow. Further, the shape of the slideshow window 108 and the tag cloud 104 may be any desired shape.

Figure 5:
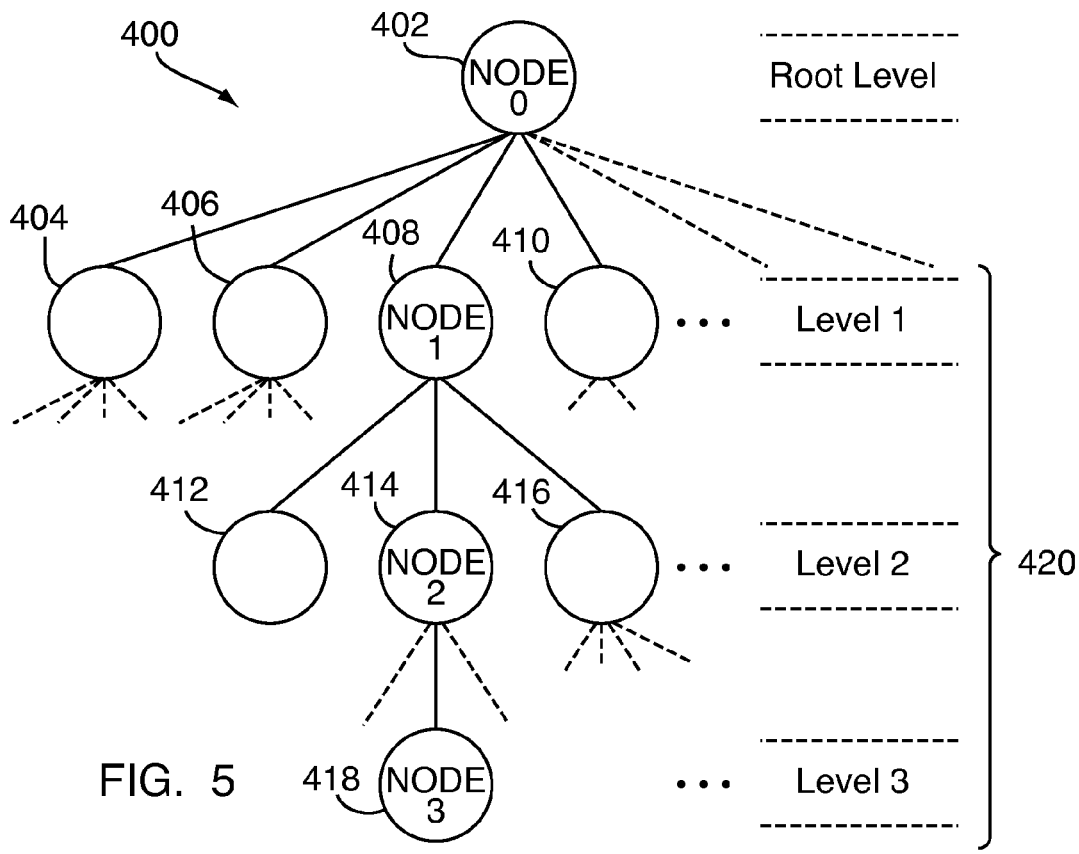
FIG. 5 is a diagram of a generic browse node tree, in accordance with embodiments of the present disclosure.

Referring to FIG. 5, it is known in the art of computer databases and computer-based websites to use "browse trees" to help categorize and/or identify items, such as is described in pending U.S. patent application Ser. No. 11/540,933, filed Sep. 29, 2006, entitled "Method And System For Displaying Attributes Of Items Organized In A Searchable Hierarchical Structure", which is incorporated herein by reference in its entirety. As the name suggests, the "browse" tree 400 permits users (or the merchant) to "browse" through various items, which are logically arranged in the form of a hierarchical tree arrangement of browse nodes 402-418, having a plurality of different levels 420. Each of the browse nodes 402-418 may be associated with a category of items in a hierarchical manner. Thus, the browse tree 400 may be viewed as a collection of categories, each category corresponding to one of the browse nodes 402-418 of the tree 400 and each of the browse nodes 402-418 being associated with one or more items. The merchant server 24 may store the information and relationships associated with one or more browse trees for all items sold by the merchant. Accordingly, the browse tree 400 may be used by the merchant website 22 to display categories or groups of items for the customer 10 to use while shopping or browsing the merchant website 22 as well as used to categorize and/or identify items for various uses.

More specifically, in FIG. 5, a "root" node 402 of the tree 400 may represent all or a subset of items in a given category of items on the merchant 20 website 22, such as "Books," "DVDs", "Electronics," "Tools and Automotive," etc. Each root browse node 402 may have different child browse nodes 404-410 representing sub-categories under the parent or root node 402. Similarly, each of the child nodes 404-410 may have different lower level child nodes, e.g., for node 408, there may be three child nodes 412-416. Also, under each of the nodes 412-416 there may be one or more lower level child nodes, such as the node 418. At the bottom of the tree 400 is a "leaf" node 418 that has associated with it one or more actual items or products (i.e., "leaves"), which are available for purchase and are all related to the leaf node 418. A leaf node may be at any level in the tree and has no child nodes. Accordingly, due the hierarchical structure of the tree 400, a given item may be associated with a plurality of nodes at different levels in the same node lineage (or tree branch). For example, in FIG. 5, all the items associated with the level 3 node 418 are also associated with the higher parent nodes 414 (level 2 node), 408 (level 1 node), and 402 (root node or level 0 node).

Figure 6:
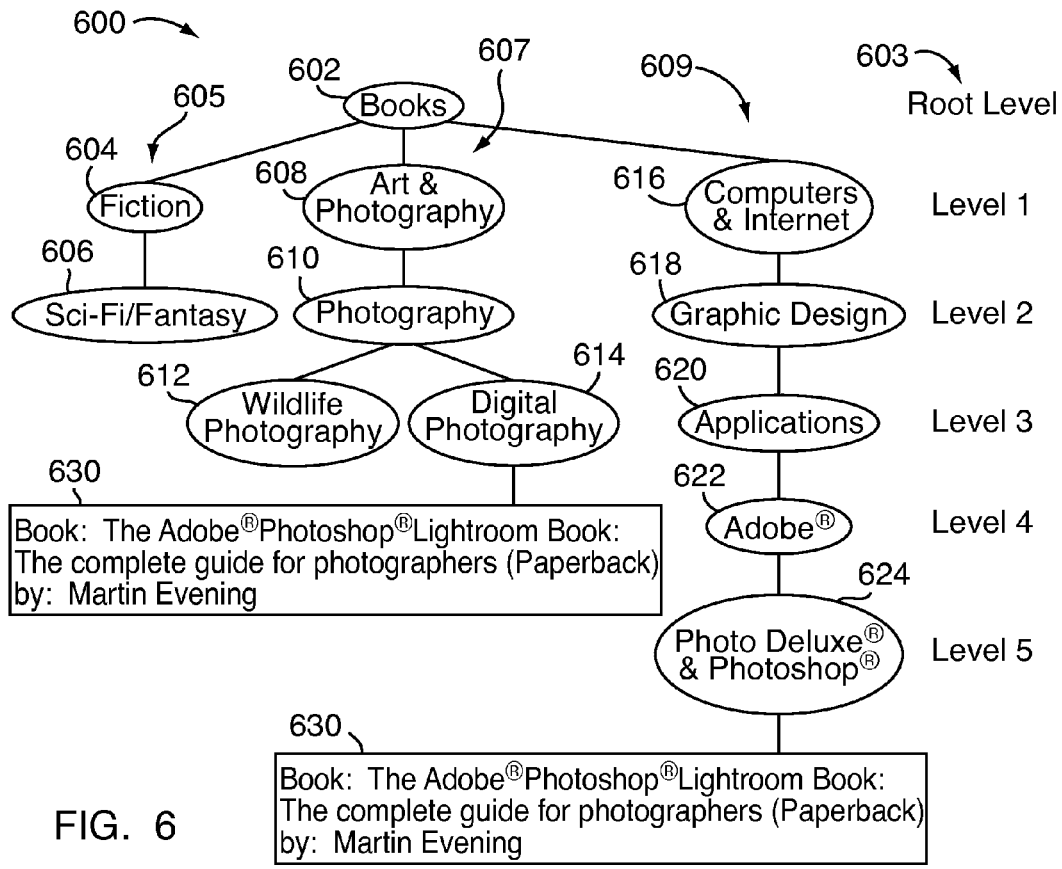
FIG. 6 is a diagram of an example browse node tree, in accordance with embodiments of the present disclosure.

Referring to FIG. 6, a sample tree 600 is illustrated that shows five levels 603 below a root level node 602 for a main merchant item category of "Books", and three branches 605, 607,609 of browse nodes corresponding to "Fiction", "Art & Photography", and "Computers & Internet", respectively. The "Fiction" branch 605 has two nodes 604,606 and spans two levels. The "Art & Photography" branch 607 has four nodes 608,610,612,614 and spans three levels. The nodes 612,614 are at the same level, Level3. The "Computers & Internet" branch has five nodes 616-624 and spans five levels, Level 1 to Level 5.

Further, the number of items associated with a given node decreases with lower browse node levels. For example, the total number of books (or items) sold by the merchant may be five million at the root node 602, the number of Art & Photography books may be twenty thousand at the Level 1 node 608, the number of Photography books may be five thousand at the Level 2 node 608, and the number of Digital Photography books may be five hundred at the Level 3 leaf node 608.

Also, as discussed hereinbefore with FIG. 2, a given item may be associated with (or listed under) more than one node (or category). For example, the book item 630: "The Adobe Photoshop Lightroom Book: The Complete Guide for Photographers" (Paperback), by: Martin Evening, may be associated with the leaf node 614 "Digital Photography" under the "Art & Photography" branch 607 of the tree 600, and also associated with the leaf node 624 "Photo Deluxe & Photoshop" under the "Computers & Internet" branch 609 of the tree 600. Thus, in this example, the two nodes 614 and 624 are both associated with the same item 630.

Figure 7:
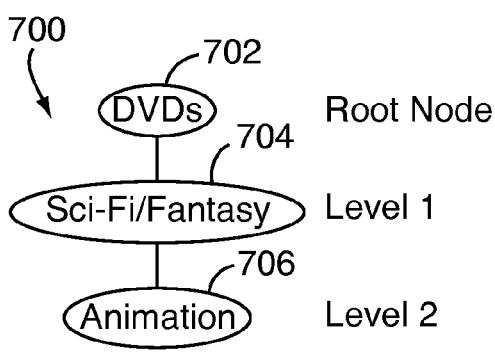
FIG. 7 is a diagram of another example browse node tree, in accordance with embodiments of the present disclosure.

Referring to FIGS. 6 & 7, there may be two browse nodes that have the same name in different browse trees or different branches of a tree. For example, in the "Fiction" branch of the "Books" tree 600 there may be the leaf node 606 "Sci-Fi/Fantasy". Referring to FIG. 7, similarly, in a "DVDs" tree 700, having a root node 702, there may be a node 704 called "Sci-Fi/Fantasy". If the two nodes 606,704 both have at least three items associated therewith, there may be two browse nodes with the same name "Sci-Fi/Fantasy". In that case, the items associated with the two nodes 606,704 may be combined under the common node name "Sci-Fi/Fantasy" for use in generating the tags 106 to avoid possible confusion of having two tags with the same name in the same cloud (discussed more hereinafter). Thus, in the above example, there would be both DVD items and Book items associated with same "Sci-Fi/Fantasy" tag.

Figure 8:
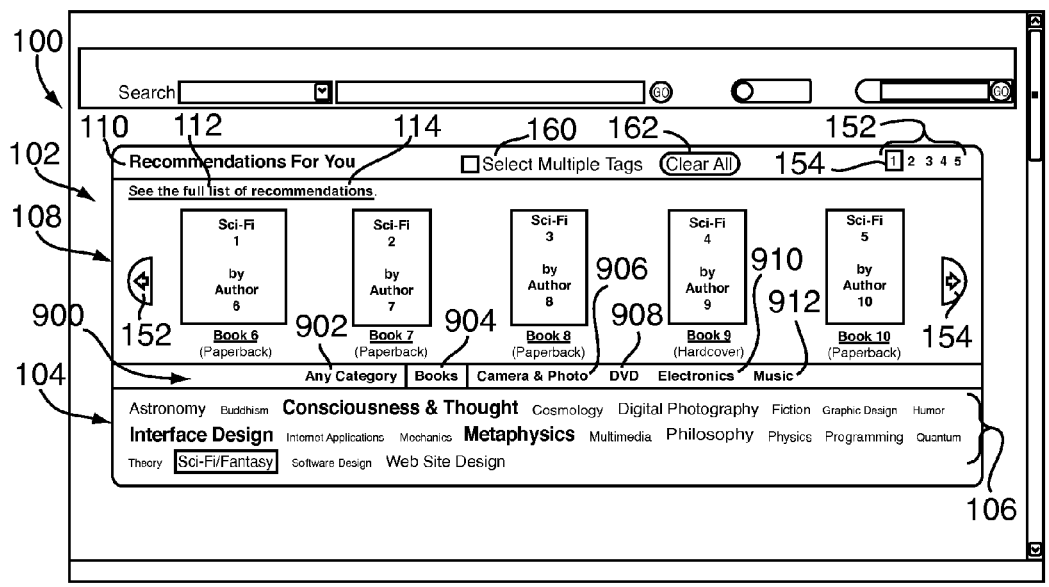
FIG. 8 is a screen illustration of a recommendations window having category tabs, in accordance with embodiments of the present disclosure.

Referring to FIG. 8, the recommendations window 102, may have a high level categories tab bar 900, having a series of tabs 902-912, e.g., Any Category, Books, Camera & Photo, DVD, Electronics, Music, respectively that allows the customer 10 to select different tag clouds 104 for various items. A mouse click on one of the labeled tabs 902-912 will cause the tag cloud 104 to display tags associated only with the category of items labeled on that tab. Any tab categories may be used. Accordingly, if there are two nodes that have the same name but are in different main category areas as discussed with respect to FIG. 7 for Books and DVDs, there is no need to combine the two nodes 606,704. In particular, having identical category tags tied to different tag clouds may avoid the situation of having multiple item types associated with the same tag. Referring again to FIGS. 6 and 7, in that example, the Sci-Fi/Fantasy DVD items would appear under the "Sci-Fi/Fantasy" tag in the DVDs cloud (accessed by clicking the DVDs tab 908), and the Sci-Fi/Fantasy Book items would appear under the "Sci-Fi/Fantasy" tag in the Books cloud (accessed by clicking on the Books tab 904).

Figure 4:
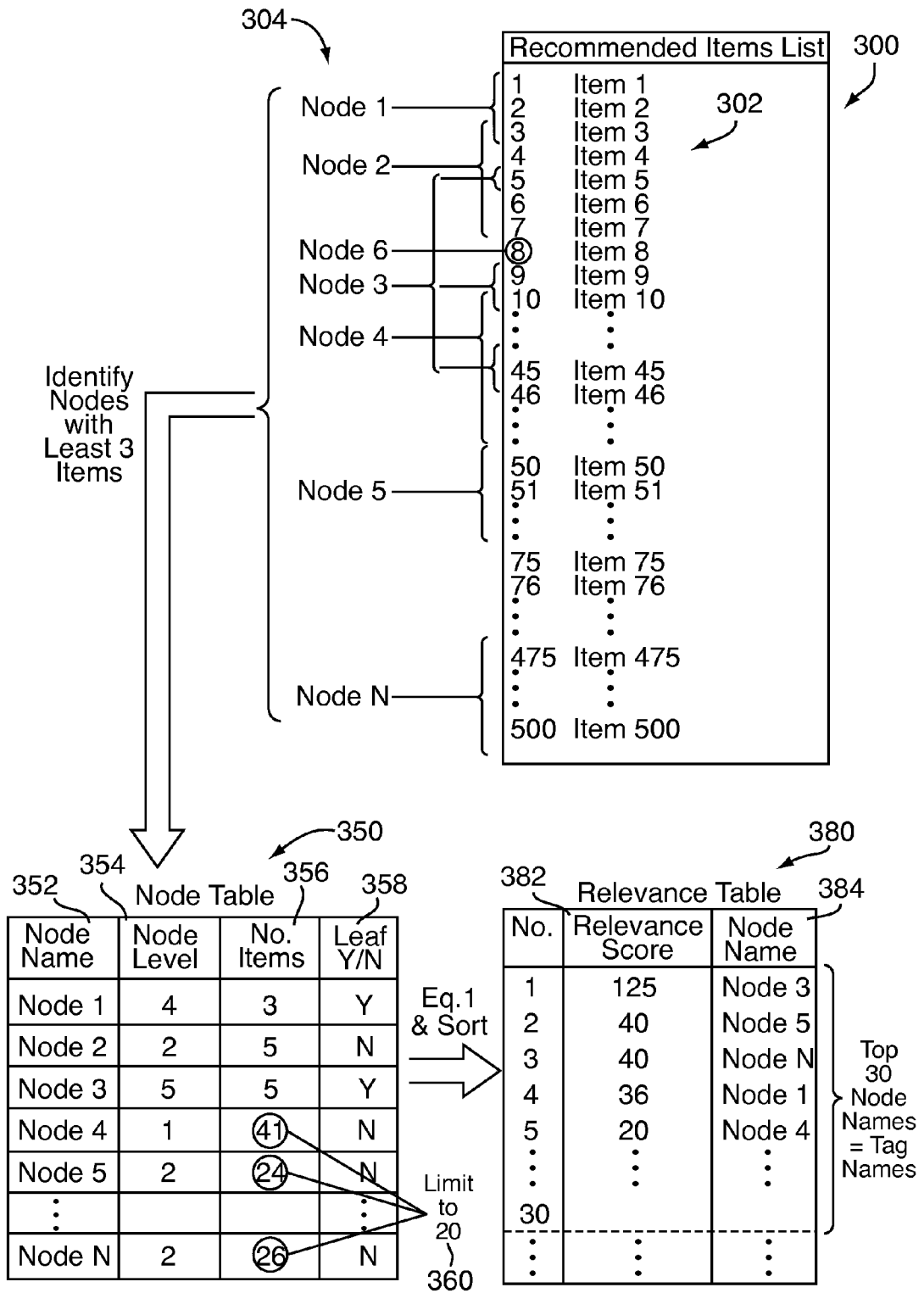
FIG. 4 is a diagram of a recommendations items list, node table and relevance table, in accordance with embodiments of the present disclosure.

Referring to FIG. 4, the tags 106 (FIG. 2) in the tag cloud 104 are generated by grouping items 302 from a recommended items list 300, into their associated tags 106 (or categories or buckets) that are displayed in the tag cloud 104 (FIG. 2). The recommended items list 300 may be obtained by any technique for providing a personalized recommendations list of items that are grouped into categories or tags, such as that discussed in U.S. Pat. No. 6,317,722, entitled "Use of Electronic Shopping Carts to Generate Personal Recommendations", issued Nov. 13, 2001, to Jacobi, et al, or any other technique that provides a list of recommended items associated with a particular customer 10. The list may be sorted by relevance to the particular customer, e.g., most recommended item to least recommended item, and it may also provide the browse nodes associated with each item. According to some embodiments, the recommended list of items could even be manually generated either individually or collaboratively, such as from suggestions by other users of the merchant's website and/or by agents of the merchant. The grouping of items from the list 300 may be accomplished using browse nodes associated with a browse tree, such as that discussed hereinbefore with FIGS. 5-7, and assigning a respective one of the tags 106 (FIG. 2) for each of the selected browse nodes.

In particular, each of the items 302 on the recommended items list 300 is associated with one or more browse nodes (or nodes) 304, such association is provided as part of the recommended Items list 300. For example, in FIG. 4, Items 1-3 are associated with Node 1, Items 3-7 are associated with Node 2, Item 5 and Items 9-10 and items 45-46 are all associated with Node 3, Items 10-50 are associated with Node 4, Items 51-76 are associated with Node 5, and Items 475-500 are associated with Node N. Also, each of the nodes 304 has a level, e.g., Level 1, 2, 3, 4, etc., associated with its distance from the root node, as discussed hereinbefore with FIGS. 5, 6 & 7, and a node name, e.g., "Art & Photography", "Computers & Internet", "Action & Adventure", etc., indicative of the category to which the items are associated.

Figure 10:
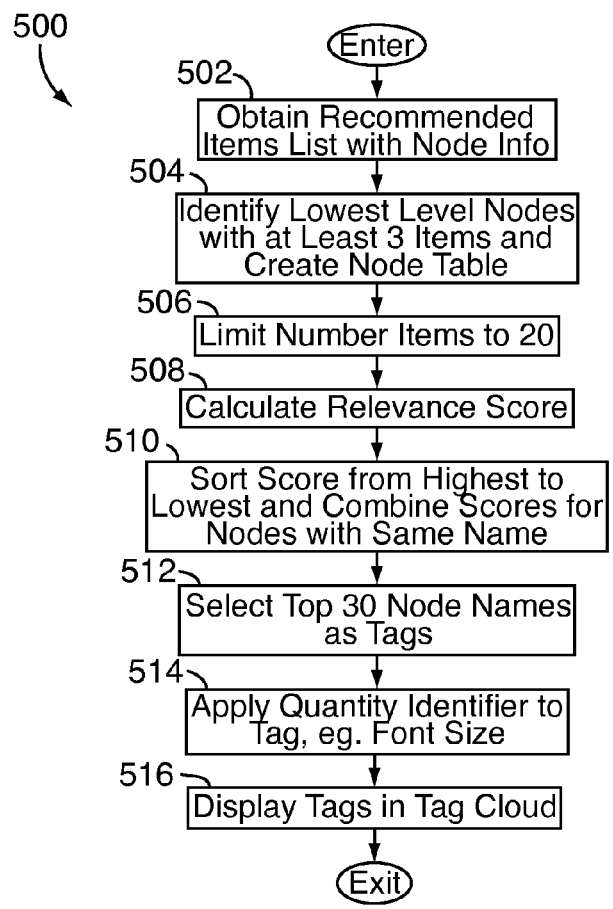
FIG. 10 is a flow chart of a tag generation process, in accordance with embodiments of the present disclosure.

Referring to FIGS. 4 and 10, a process 500 for generating the tag cloud 106 (FIG. 2) may start at a block 502 which obtains the recommend items list 300 with the recommended items 302 and the corresponding nodes 304 associations, as discussed hereinbefore with respect to FIG. 4. Next, a block 504 identifies the lowest level nodes having at least a threshold number of items (here, three items) and creates a node table 350 (FIG. 4). The node table 350 (FIG. 4) has a Node Name column 352 that lists the names of the lowest level nodes having at least three items. If a given node has less than three items, that node is not used and the next higher level node is used instead as the selected node (provided it meets the other criteria discussed herein). As discussed hereinbefore with FIGS. 5-7, the next higher level node includes all the items of the lower nodes. Also, if there is a browse node name that is not sufficiently descriptive, is uninformative, or is otherwise not appropriate to be included in the recommendations for the customer 10 as determined by the merchant 20, that node is also not used and the next higher node is used instead as the selected node (provided it meets the other criteria discussed herein). For example, node names such as "16:10", "10× to 19×", "2 to 2.9 MP", "$100-199", may be nodes that are considered uninformative. These inappropriate nodes may be culled from the list manually and/or, where possible, using automated methods. An automated method may include, for example, removing any categories with no words and/or no words found in a customized or generic dictionary.

The node table 350 also has a Node Level column 354 that lists the node level (NL), indicative the number of levels away from the root node for a given node tree. Also, the node table 350 has a No. Items column 356 that lists the number of items associated with that node, and a Leaf Y/N column 358 that indicates whether or not each node is a leaf node.

Next, a block 506 limits the number of items for each tag to the maximum number of items allowed for each tag, e.g., twenty. Any other maximum limit may be used for the number of items for each tag. In the example of FIG. 4, the Node 4, Node 5, and Node N each have more than twenty items and thus they will be limited to twenty items, as indicated by a numeral 360. The twenty items may be selected as the first twenty items in the list, if they are sorted from most relevant to least relevant item; however, any selection criteria may be used.

Next, a block 508 calculates a Relevance Score as follows:

$$\text{Relevance Score} = BL \times NRI \times [NRI(\text{if Leaf}) \text{ or } 1(\text{if NOT Leaf})] \quad \text{Eq. 1}$$

where, BL=Browse Level, which is the distance of a selected node from the root or highest level parent node; NRI=Number of Recommended Items for that node; and NRI(if Leaf)=NRI if the node is a Leaf Node; and 1(if NOT Leaf)=1 if the Node is not a Leaf node.

The relevance score provides an indication of how relevant a particular node is likely to be for the customer 10. For example, deep browse nodes, e.g., digital photography (level 3) (FIG. 6) are preferred to top level nodes, e.g., "Art & Photography" (level 1)(FIG. 6), because they tend to provide more specific information to the customer 10 in the tag cloud 106 about recommended items.

Therefore, when a selected node is a leaf node, the relevance score for that node is computed as:

$$\text{Relevance Score (Leaf)} = BL \times NRI^2 \quad \text{Eq. 2}$$

Thus, according to this embodiment, leaf nodes are given a much higher relevance score than non-leaf nodes, as they may provide more relevant information to the customer 10. Conversely, if the node is not a leaf node, the relevance score is computed as:

$$\text{Relevance Score (Non-Leaf)} = BL \times NRI \quad \text{Eq. 3}$$

In the example of FIG. 4, there are two leaf nodes, Node 3 and Node 1, the rest of the nodes in that example are not leaf nodes. Further, the Nodes 4, 5, and N each have more than twenty items and, thus, they will be limited to twenty, as discussed herein and as indicated by a numeral 360. Accordingly, as shown in a relevance table 380, the Node 3, which is a leaf node, has the highest relevance score with 125 (5×5×5), followed by Node 5 having a relevance score of 40 (2×20), followed by Node N having a relevance score of 40 (2×20), followed by Node 4 having a relevance score of 20 (1×20).

Next, a block 510 sorts the relevance scores from highest to lowest and puts the sorted result into the relevance table 380 (FIG. 4), having a column 382 listing the sorted relevance scores for all the selected nodes and a column 384 listing the name of each of the nodes. In addition, prior to sorting, the block 510 combines scores for nodes having the same name into a single node name to avoid confusion (as discussed hereinbefore with FIG. 7). Next a block 512 selects the top 30 browse nodes from the table 380 as the tag names. Next, a block 514 applies the quantity identifier 111 (FIG. 2) to the tags 16 based on the number of items associated with each tag, e.g., font size or the other visual quantity identifier discussed hereinbefore. Next, a block 516 displays the tags 106 with the quantity identifier 111 in alphabetical order in the tag cloud 104 (FIG. 2). The tags may be displayed in any desired order, e.g., based on tag size, number of recommended items, or any other order.

The aforementioned block 506 that limits the number of items per tag may instead be performed after the block 512 to ensure no tag has more than the predetermined maximum number of items. In that case, nodes having items greater than twenty will have larger relevance scores and be positioned in the relevance table 380 accordingly.

Optionally, if the total number of recommended items for all tags is less than a predetermined number, e.g., five, the tag cloud 104 is not shown at all and the items are listed only in the viewer 108. Other or no minimum number of items for display of the tag cloud may be used.

Furthermore, for any of the embodiments described herein, whenever the screen is updated in response to a customer 10 action or selection/deselection, it may be updated such that a new window (or screen section) is displayed within a currently displayed HTML (Hyper Text Markup Language) page, web page, or browser screen (and, thus, no new HTML page, web page, or browser screen is generated). This is to be distinguished from other conventional techniques, where new HTML pages open up over an existing page when a feature, attribute, or icon is selected or deselected by the user.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods of low-power computer operation in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

The invention claimed is:

1. A computer-implemented method, comprising:
obtaining a list of recommended items;
identifying at least one browse node associated with at least a predetermined number of the recommended items in the list, wherein each of the browse nodes corresponds to a category;
identifying a level associated with each of the browse nodes;
calculating a relevance score for each of the browse nodes based on the level, wherein the relevance score is an indication of the relevance of the browse node to a customer;
sorting each of the browse nodes by the relevance score;
designating a predetermined number of the browse nodes as a plurality of categories;
causing display of said categories on a computer display, using at least one computer processor, each of said categories displayed having a quantity identifier associated therewith, wherein the quantity identifier is at least one of a text font size, a text font style, a text font color, a background color, an outline color, or an image indicative of a number of items in said category;
accepting the selection of at least one of said categories; and
causing display of a viewer on the computer display having a predetermined number of said items displayed therein corresponding to items in the at least one of said categories.

2. A computer-implemented method, comprising:
identifying at least one browse node associated with at least a predetermined number of recommended items in a list, wherein each of the browse nodes corresponds to a category;
identifying a level associated with each of the browse nodes;
calculating a relevance score for each of the browse nodes based on the level, wherein the relevance score is an indication of the relevance of the browse node to a customer;
sorting each of the browse nodes by the relevance score;
designating a predetermined number of the browse nodes as a plurality of categories;
causing display of at least some of the plurality of categories on a computer display, using at least one computer processor, each of said displayed categories having a quantity identifier associated therewith indicative of a number of recommended items in said displayed category; and
causing display of a viewer on the computer display, using the at least one computer processor, said viewer having a predetermined number of images therein corresponding to recommended items in at least one of said displayed categories.

3. The method of claim 2, wherein said quantity identifier comprises a visual attribute of each of said displayed categories.

4. The method of claim 2, wherein said quantity identifier comprises at least one of: a text font size, a text font style, a text font color, a background color, an outline color, or an image.

5. The method of claim 2, further comprising accepting a selection of at least one of said displayed categories.

6. The method of claim 5, wherein said accepting comprises accepting a selection of a plurality of categories.

7. The method of claim 2, wherein said viewer is adapted to scroll said images in a predetermined direction in response to a selection of at least one scroll button in said viewer.

8. The method of claim 7, wherein said viewer is adapted to scroll said images to the right when a right arrow scroll button is selected, and
wherein said viewer is adapted to scroll said images to the left when a left arrow scroll button is selected.

9. The method of claim 2, further comprising:
receiving a selection of at least one image in the viewer, and
allowing a purchase of at least one item associated with the at least one selected image.

10. The method of claim 2, wherein said at least one lowest level browse node has at least a predetermined number of items associated therewith.

11. The method of claim 10, further comprising:
calculating a relevance score for each of said browse nodes,
wherein said relevance score is calculated according to the equation: Relevance Score=BL×NRI^2, and
wherein said relevance score is calculated according to the equation: Relevance Score=BL×NRI, where BL is a Browse Level, and where NRI is the number of items from said list associated with said node when said browse node is not a leaf node.

12. The method of claim 11, further comprising:
selecting a predetermined number of best nodes as the nodes having the highest relevance scores,
wherein said displayed categories are indicative of said best nodes.

13. The method of claim 2, further comprising:
limiting the number of said recommended items associated with said displayed categories to a predetermined item limit number.

14. The method of claim 2, further comprising:
causing display of at least two high level category tabs,
receiving a selection of at least one of said high level category tabs, and
causing display of said categories in response to the selection of at least one of said high level category tabs, said displayed categories being associated with said tab selected.

15. The method of claim 2, wherein sorting each of the browse nodes by the relevance score comprises:
logically arranging the browse nodes in a hierarchical manner.

16. The method of claim 15, wherein the hierarchical manner is determined at least in part on the level of the browse nodes.

17. The method of claim 15, wherein logically arranging the browse nodes in the hierarchical manner comprises designating one of the browse nodes as a root node.

18. A computer-implemented method for causing the display of categories having items associated therewith, comprising:
identifying at least one browse node associated with at least a predetermined number of recommended items, wherein each of the browse nodes corresponds to a category;
identifying a level associated with each of the browse nodes;
calculating a relevance score for each of the browse nodes based on the level, wherein the relevance score is an indication of the relevance of the browse node to a customer;
sorting each of the browse nodes by the relevance score;
designating a predetermined number of the browse nodes as the plurality of categories;
causing the display of at least some of said plurality of categories on a computer display, using at least one computer processor, each of said displayed categories displayed having a quantity identifier associated therewith indicative of the quantity of items associated with said displayed categories, said quantity identifier being a visual attribute of the display of said displayed categories; and
causing the display of a viewer having a predetermined number of images therein, wherein each of said images corresponds to at least one of the items in at least one of said displayed categories, using at least one computer processor.

19. The computer-implemented method of claim 18, wherein said quantity identifier comprises at least one of a text font size, a text font style, a text font color, a background color, an outline color, or an image.

20. The computer-implemented method of claim 18, further comprising accepting a selection of at least one of said displayed categories.

21. A method performed by a computer system, comprising:
identifying at least one browse node associated with at least a predetermined number of recommended items, wherein each of the browse nodes corresponds to a category;
identifying a level associated with each of the browse nodes;
calculating a relevance score for each of the browse nodes based on the level, wherein the relevance score is an indication of the relevance of the browse node to a customer;
sorting each of the browse nodes by the relevance score;
designating a predetermined number of the browse nodes as the plurality of categories;
causing the display of at least one of the plurality of categories on a computer display, using at least one computer processor, wherein each of said displayed categories has a quantity identifier associated therewith indicative of a number of items in said category; and
causing the display of a viewer having a predetermined number of images therein, wherein each of the images corresponds to at least one item in at least one of said displayed categories, using at least one computer processor.

22. A non-transitory computer readable medium having a computer executable component, the computer executable component comprising
a generating component adapted to cause at least one computer processor to:
identify at least one browse node associated with at least a predetermined number of recommended items in a list, wherein each of the browse nodes corresponds to a category;
identify a level associated with each of the browse nodes;

calculate a relevance score for each of the browse nodes based on the level, wherein the relevance score is an indication of the relevance of the browse node to a customer;

sort each of the browse nodes by the relevance score;

designate a predetermined number of the browse nodes as a plurality of categories; and a user interface component adapted to cause the at least one computer processor to:

cause display of at least some of the plurality of categories, said plurality of categories being displayed using a quantity identifier, and cause the display of a viewer having a predetermined number of said items therein corresponding to items in at least one of said displayed categories.

23. The apparatus of claim 22, wherein said user interface component is further adapted to accept the selection of at least one of said displayed categories.

24. A computer system having a computer comprising at least one computer processor and a memory, wherein the computer is adapted to execute a computer program stored in the memory which causes the computer system to perform a method comprising:

identifying at least one browse node associated with at least a predetermined number of recommended items, wherein each of the browse nodes corresponds to a category;

identifying a level associated with each of the browse nodes;

calculating a relevance score for each of the browse nodes based on the level, wherein the relevance score is an indication of the relevance of the browse node to a customer;

sorting each of the browse nodes by the relevance score;

designating a predetermined number of the browse nodes as the plurality of categories;

causing display of at least some of the plurality of categories, each of said categories being displayed having a quantity identifier associated therewith indicative of a number of items in said displayed category; and causing display of a viewer having a predetermined number of said recommended items therein corresponding to at least one of said categories.

25. The computer system of claim 24, wherein the method further comprises accepting a selection of at least one of said displayed categories.

26. The computer system of claim 24, wherein said quantity identifier comprises a visual attribute of the display of said displayed categories.

27. The computer system of claim 24, wherein said quantity identifier comprises at least one of a text font size, a text font style, a text font color, a background color, an outline color or an image.

* * * * *